(12) United States Patent  
Cope et al.

(10) Patent No.: US 7,404,868 B2  
(45) Date of Patent: Jul. 29, 2008

(54) TAPE PLACEMENT HEAD FOR APPLYING THERMOPLASTIC TAPE TO AN OBJECT

(75) Inventors: Ralph D. Cope, Elkton, MD (US); Steve B. Funck, Hartly, DE (US); Mark B. Gruber, Landenberg, PA (US); Mark A. Lamontia, Landenberg, PA (US); Anthony D. Johnson, Conowingo, MD (US)

(73) Assignee: Accudyne Systems, Inc., Nework, DE (US)

( * ) Notice: Subject to any disclaimer, the term of this patent is extended or adjusted under 35 U.S.C. 154(b) by 158 days.

(21) Appl. No.: 11/548,002

(22) Filed: Oct. 10, 2006

(65) Prior Publication Data

US 2008/0083505 A1    Apr. 10, 2008

(51) Int. Cl.
*B32B 37/00* (2006.01)

(52) U.S. Cl. .......................... 156/71; 156/82; 156/212; 156/468; 156/497; 156/498; 156/577

(58) Field of Classification Search .................... 156/71, 156/82, 196, 212, 443, 468, 497, 498, 499, 156/574, 577
See application file for complete search history.

(56) References Cited

U.S. PATENT DOCUMENTS

| 3,775,219 | A | 11/1973 | Karlson |
| 4,954,204 | A | 9/1990 | Grimshaw |
| 4,990,213 | A | 2/1991 | Brown |
| 4,992,133 | A | 2/1991 | Border |
| 5,269,869 | A | 12/1993 | Peterson |
| 5,314,563 | A | 5/1994 | Grimshaw |
| 5,316,612 | A | 5/1994 | Peterson |
| 5,352,306 | A | 10/1994 | Grimshaw |
| 5,454,897 | A * | 10/1995 | Vaniglia ..................... 156/166 |
| 5,587,041 | A | 12/1996 | Sandusky |
| 5,698,066 | A * | 12/1997 | Johnson et al. ............. 156/441 |
| 5,700,347 | A | 12/1997 | McCowin |
| 5,738,749 | A | 4/1998 | Grimshaw |
| 5,989,384 | A | 11/1999 | Grimshaw |
| 6,096,164 | A * | 8/2000 | Benson et al. .............. 156/425 |

FOREIGN PATENT DOCUMENTS

| EP | 0 371 289 A | 6/1990 |
| EP | 0 431 916 A | 6/1991 |
| WO | WO 2007/076775 A | 7/2007 |

\* cited by examiner

*Primary Examiner*—James Sells
(74) *Attorney, Agent, or Firm*—Connolly Bove Lodge & Hutz LLP (57) ABSTRACT

A tape placement head for applying thermoplastic tape to an object includes a heated feeder which guides the tape/tow to a heated zone. The heated zone has a line compactor having a single row of at least one movable heated member. An area compactor is located in the heated zone downstream from the line compactor. The area compactor includes a plurality of rows of movable feet which are extendable toward the tape/tow different distances with respect to each other to conform to the shape of the object. A shim is located between the heated compactors and the tape/tow. A chilled compactor is in a chilled zone downstream from the heated zone. The chilled zone includes a line chilled compactor and an area chilled compactor. A chilled shim is mounted between the chilled compactor and the tape/tow.

23 Claims, 6 Drawing Sheets

TAPE PLACEMENT HEAD FOR APPLYING THERMOPLASTIC TAPE TO AN OBJECT

GOVERNMENT LICENSE RIGHTS

The United States government has rights in this invention which was developed under NASA contract number NNL04AB24P.

BACKGROUND OF THE INVENTION

There are various products having a skin made by applying a thermoplastic tape to the product or object. Generally, the applied tape is in a heated condition when in contact with the object and then is cooled to cure and become permanently bonded. Such objects have various types of uses. One type of object is in the aeronautics industry where the object might be, for example, a wing or fuselage of an aircraft. Frequently in making the skin a laminate is formed by applying multiple layers of the thermoplastic tape on the object.

SUMMARY OF THE INVENTION

An object of this invention is to provide an automatic thermoplastic in situ tape placement head which incorporates conformable compactors.

A further object of this invention is to provide such a tape placement head wherein thermoplastic fiber placement and tape placement is used to achieve out-of-autoclave fabrication of large singly-curved and doubly-curved composite structure which is particularly adapted for aerospace use.

In accordance with this invention, the head for applying thermoplastic tape to an object includes a creel which has a roll of thermoplastic tape or tow on the creel. The tape passes from the creel through a heated zone which includes a heated area compactor having a plurality of movable heated members or feet that would be moved toward the tape and would maintain the tape in a heated condition so as to press the heated tape against the object. A chilled area compactor is in a chilled zone disposed downstream and also includes a plurality of movable members or feet which, however, are at a chilled temperature so as to cure the tape. A shim is located in each of the heated and chilled zones to dispose the shim between the feet and the tape in each zone and thereby protect the tape from any damage that might otherwise occur from direct contact of the feet against the tape. Thus, the feet are moved into contact with the shim which in turn is pressed against the tape thereby applying the tape to the object. By having a plurality of individual feet which are independently movable in each of the compactor areas the compactor readily conforms to the shape of the object.

In a preferred practice of this invention the feet are moved toward the shims by an air cylinder which presses a reservoir housing against a conformable bladder thereby causing the bladder to press against the feet. Preferably, a thermal break is provided in the heated compactor area to keep the heat from getting to the bladder and melting the bladder.

In the preferred practice of this invention a heated line compactor is also provided upstream from the heated compactor area and the chilled compactor includes a chilled line compactor so that three conformable compactors are thereby used in the tape placement head.

DETAILED DESCRIPTION

The present invention relates to a tape placement head for applying thermoplastic tape to an object. In its preferred practice the present invention relates to an automated thermoplastic in situ tape placement head incorporating at least two and preferably three conformable compactors. The head is capable of fitting conventional gantry-style motion mechanisms such as a tape layer.

Figure 1:
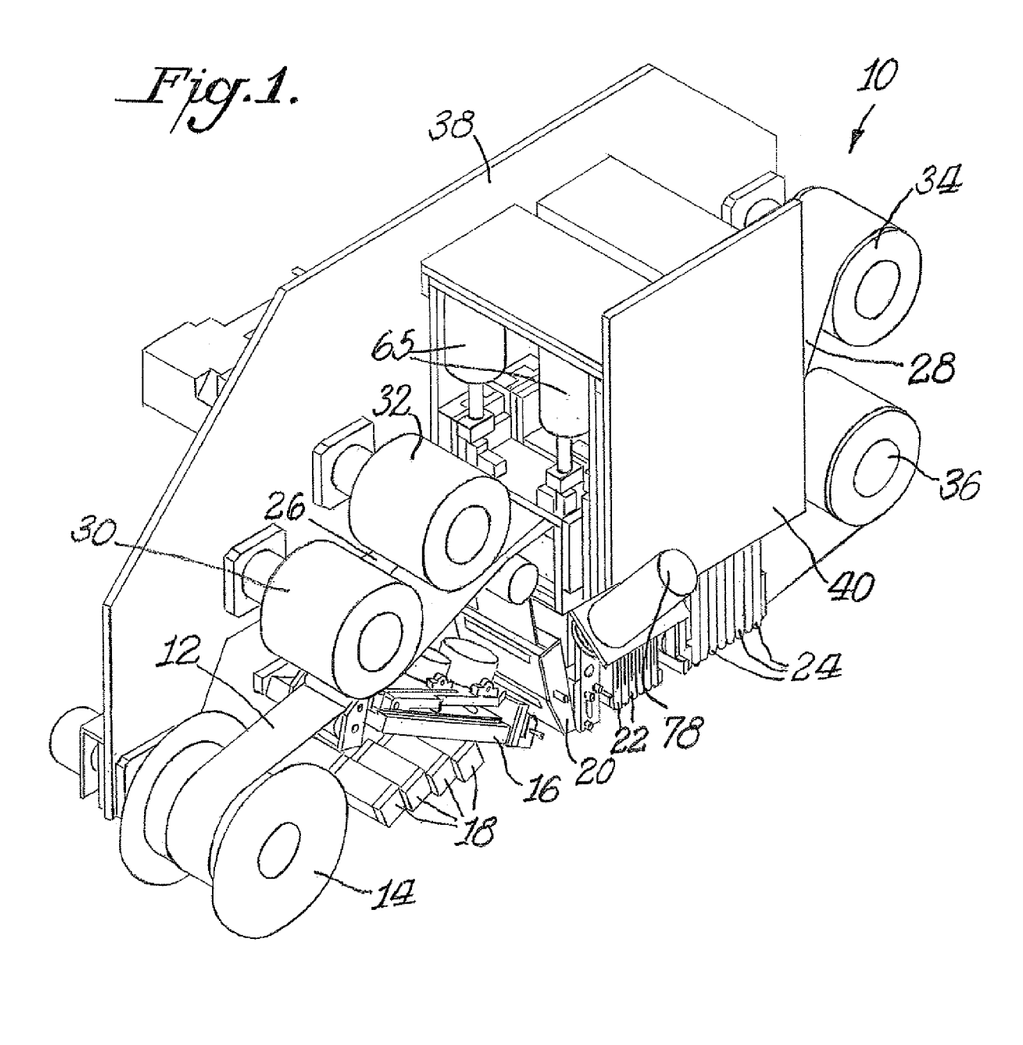
FIG. 1 is a perspective view of a tape placement head in accordance with this invention.

FIG. 1 illustrates a tape placement head 10 in accordance with this invention. As shown therein composite tape 12 despools off the creel 14 into a heated tape feeder 16. The feeder 16 may be of any suitable known construction for tape starting, feeding at controlled velocity and tape cutting. While the tape is preheated in the feeder 16 a set of heaters preferably in the form of heated gas torches 18 raises the pre-laid laminate surface temperature to its melting point. The incoming tape 12 is further heated to its melting point as it is fed beneath the three compactors. The upstream most compactor is heated line compactor 20. Next is the heated area compactor 22 and then the chilled compactor 24 which is a combined line and area compactor. With heat and even pressure the incoming thermoplastic tape 10 is consolidated layer by layer to the previously laid plies and becomes part of the laminate in, for example, forming a skin. Since each layer is fully completed after tape deposition, no autoclave is required for this in situ process.

Where head 10 is used for applying tape to objects or parts in the aerospace industry thermoplastic materials or tapes 10 are used which generally melt in the 360° C. to 400° C. temperature range. No highly viscoelastic material is generally available that can survive such high temperatures for long time periods. Accordingly, the conformable compactors are constructed from multiple articulating metal segments. The head 10 also includes shims 26,28 which protect the composite material 10 from being damaged by the segments or movable members in the compactor areas 22,24. Shim 26 is fed from a heated supply shim spool 30 and is received on heated take up shim spool 32. Shim 28 is fed from chilled supply shim spool 34 and is received by chilled take up shim spool 36. These various components are mounted to a backplate 38. Some of the components, such as the creel 14 and the spools 30,32,34 and 36 are mounted in a cantilevered fashion to backplate 38. Head 10 also includes a front plate 40.

The three compactor designs in a practice of this invention include the hot line compactor 20 which is capable of a 350 lb. force at 450° C. The hot area compactor 22 is preferably capable of 170 lb. force at 350° C. As illustrated in, for example, FIG. 3 the compactor 20 is considered a line compactor because it contains only a single row of at least one and preferably a plurality of members 42. The compactor 22 is considered an area compactor since it contains a plurality of rows of feet or multiple articulated metal segments 44. The chilled compactor 24 is actually a combined line/area compactor. In that regard, compactor 24 includes a single row of at least one and preferably a plurality of members 46 upstream from the plural feet or multiple articulating metal segments 48. The cold compactors line segments 46 preferably act with a 600 lb. force while the cold compactors area segments 48 preferably act with a 600 lb. force. In the illustrated embodiment the head 10 can place 76 millimeter (3 inch) wide tape.

Figure 2:
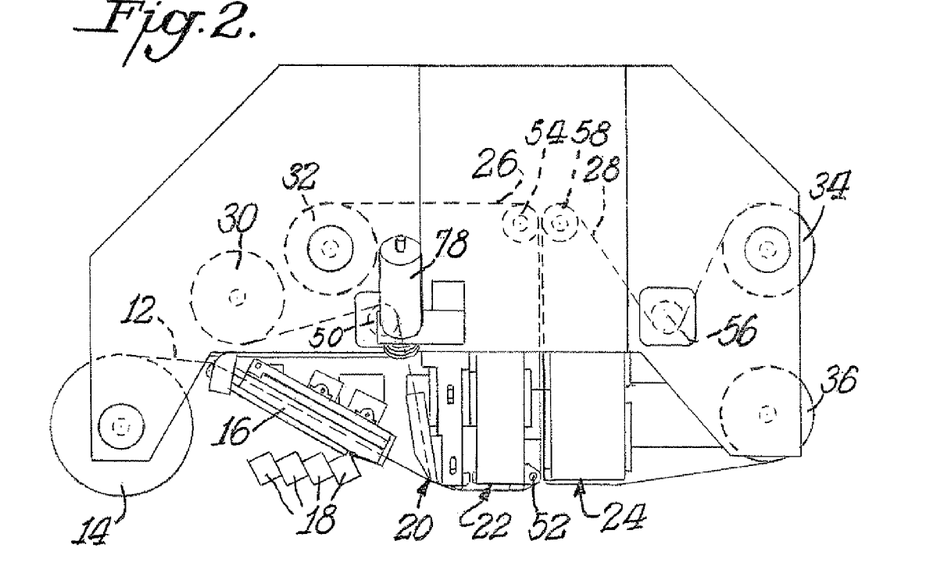
FIG. 2 is a side elevational view of the tape placement head shown in FIG. 1.

In practice the composite tape 12 is despooled from the creel 14 and is heated and compacted via the on-head polymer process. On-head shims 26 protect the molten composite tape from the conformable compactor segments 42,44 in the compactors 20,22. FIG. 2 shows in phantom the path of travel taken by shim 26 between its spools 30,32. Such path of travel is from supply spool 30 around roller 50 and then downwardly around line compactor 20 and area compactor 44 and then around roller 52 upwardly to and then around roller 54 and then to take-up spool 32. The rear shim 28 has its path of travel also illustrated in phantom in FIG. 2. As shown therein shim 28 goes from supply spool 34 around rollers 56,58 then downwardly and around chilled compactor 24 and is received by take-up spool 36. Motors would be used to drive the shims 26,28 at specific velocities for starting and compacting the tape courses. The deposition head 10 is able to place over singly-curved and doubly-curved tools to fabricate structures with complex geometry.

Shims 26,28 may be made of any suitable materials. Preferably the shims are made from a heat conductive material such as a suitable metal so as not to adversely interfere with the intended heating or chilling of the compactors.

Figure 3:
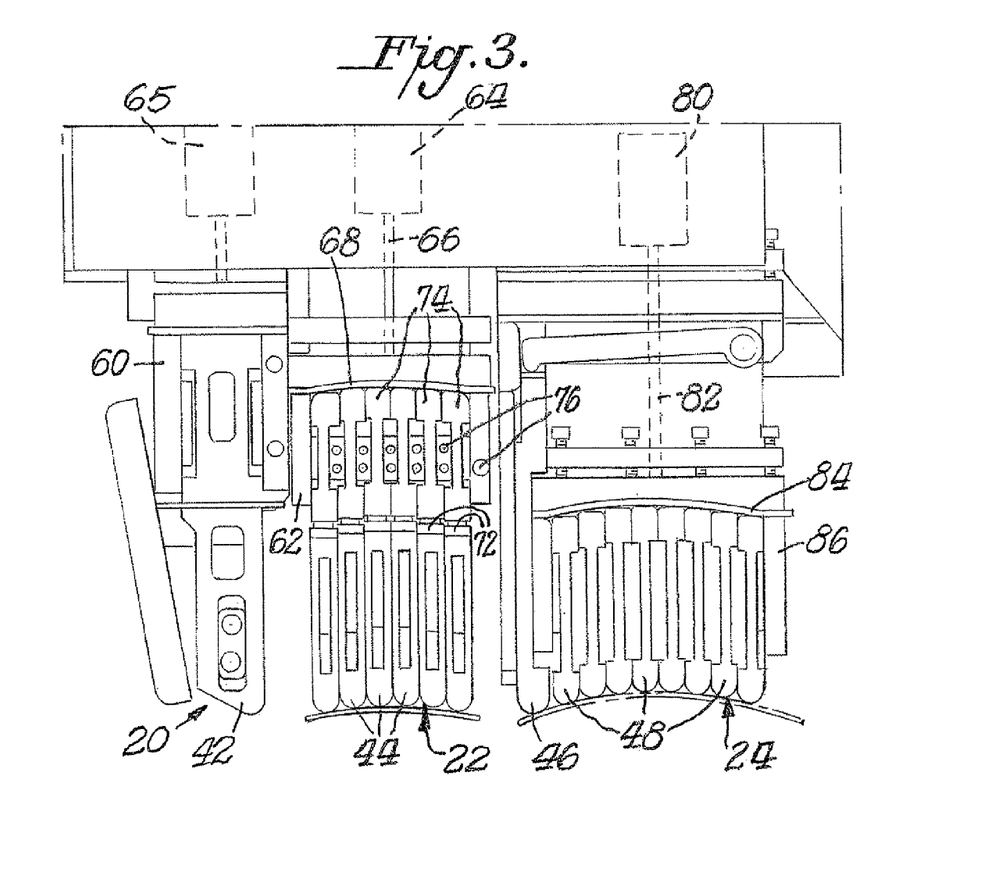
FIG. 3 is an enlarged elevational view of a portion of the tape placement head shown in FIGS. 1-2.
Figure 4:
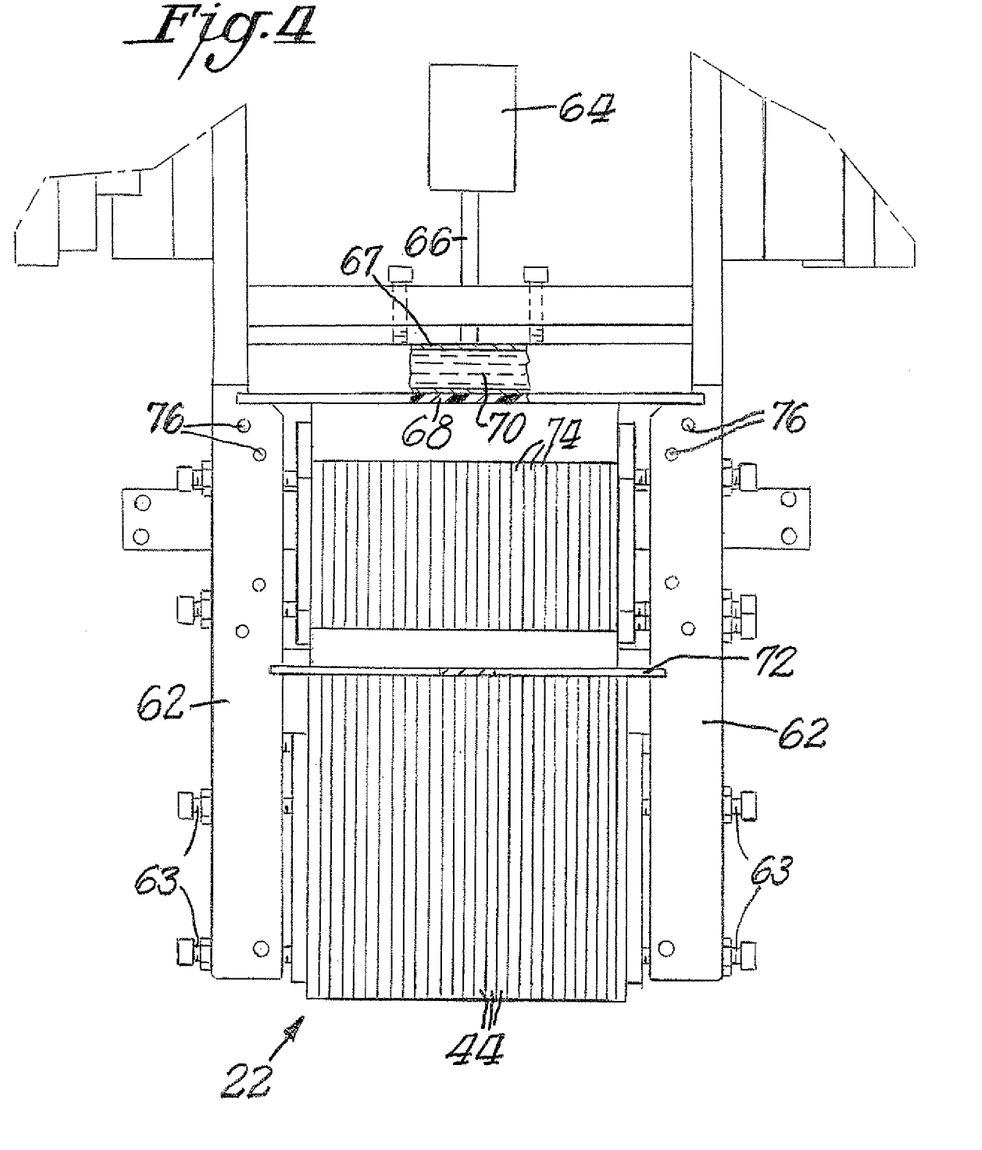
FIG. 4 is a front elevational view of the portion of the head shown in FIG. 3.

FIGS. 3-4 illustrate in greater detail the heated area compactor 22. The heated compactor is similar to a series of line compactors placed sequentially in rows. In one practice of this invention the heated area compactor 22 includes six rows of 40 segments 44 and the compactor 22 is able to heat an area 102 mm wide by 76 mm long (4 inch by 3 inch) while pushing with a 175 lb. force at 450° C. In the heated area compactor 22 the shim 26 extends from under the heated line compactor 20 to cover the segments 44 thereby protecting the tape 10. All segments in the area compactor 44 are preferably tipped with remote center compliance feet at the applicating end of the heated members. Because of the elevated temperature the metal pressure feet are coated with a high temperature coating which will not bind during operation so that the feet are conformable.

The hot area compactor 22 is preferably capable of 500° C. operation.

Both the heated line compactor 20 and the heated area compactor 22 are placed in drawers or sets of walls 60,62 so as to allow for two features. One feature is that an upstream air cylinder 64 can push with a compaction force and the other feature is that the drawer extends the overall range of motion that the compactor can accommodate.

As illustrated, the piston 66 of the air cylinder 64 pushes reservoir housing 67 filled with liquid 70 against a conformable bladder 68. The opposite end of bladder 68 is disposed against the movable heated members so that the force applied by cylinder 64 is transmitted to the movable members 44 to thereby apply pressure against the shim and in turn against the tape. Because the compactors are at elevated temperatures the conformable bladder which is preferably made of rubber is protected from the heat. This is accomplished by inserting a thermal break 72 on top of the heated pressure feet 44 with a set of chilled feet 74 between the thermal break 72 and the bladder 68. This keeps the heat from getting to the rubber bladder and melting it. FIGS. 3-4, for example, illustrate the set of chilled feet 74 to include water cooling ports 76.

Figure 5:
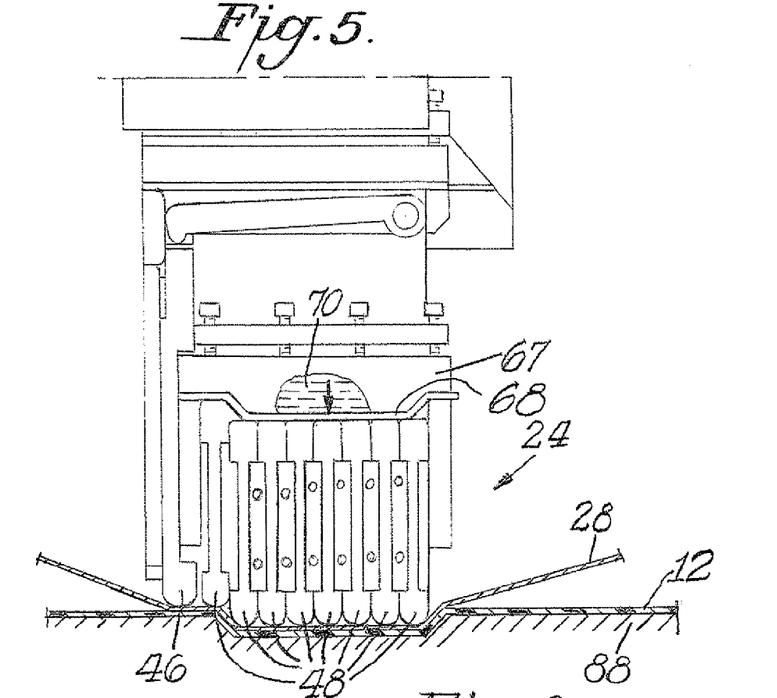
FIG. 5 is a side elevational view of a further portion of the head shown in FIGS. 1-2.

The movement of bladder 68 would be done in both the heated area compactor 22 and the chilled area compactor 24. FIG. 5 illustrates how the downward movement of segments 48 in chilled compactor 24 is the same as the downward movement of bladder 68. Line compactor 20 is actuated by air cylinders 65 which are shown in FIGS. 1 and 3.

The heated feeder and the heated line compactor and heated area compactor might be considered as being a heated zone while the chilled line/area compactor is in a chilled zone. Each line compactor would include only a single row of at least one and preferably a plurality of movable members. Each area compactor would include a plurality of rows of at least one and preferably a multiple number of feet which are independently extendable or movable with respect to each other to conform to the specific shape of the object. Each bladder pushes against the feet or movable members until the members press against the shim which then presses the tape or tow against the object. If the object has a non-planar surface different members would be moved the required and therefore different distances to maintain the tape against the object.

An IR sensor 78 (FIG. 1) monitors the temperatures in the head 10 and particularly at the heated area compactor 22. The IR sensor or camera measures the temperature in the heated zone and permits adjustment to assure maintaining the proper temperature in any suitable manner such as by, for example, controlling gas flow.

The heated line compactor 20 may include 75 segments covering a 95 mm width with the head 10 being capable of compacting at least a 76 mm width. Thus, the heated line compactor 20 is compatible with heads placing twelve 6.35 mm tows or 76 mm tape. The heated line compactor 20 may apply a 350 lb. total normal load to initiate the process by creating intimate contact between the layers of tape where a multi-layer laminate is being formed. In a practice of this invention the heated line compactor 20 is capable of 500° C. operation. In the illustrated embodiment a single shim 26 covers the heated members in both heated compactors 20 and 22. The invention could be broadly practiced where an individual shim is used for each compactor. This is not as preferred, however, since it adds to both space requirements and costs as well as in complexity. Shim thicknesses would be selected for the desired thickness requirements for robustness and conformance. The heated members or segments are selected to be thick enough to carry bending stiffness from segment edge to segment edge so as to impart a normal load to the laminate where the segments do not touch. At the same time the segments are thin enough to conform effectively to single and double curvature without unintended steering. The internal parts of the line compactor enforce a constant pressure across the segments.

As previously discussed, the chilled compactor includes both a chilled line compactor and a chilled area compactor. As shown in FIG. 3 the line segment or chilled member 46 and the area segments or feet 48 are mounted as a single module. The line compactor segments 46 are upstream and are designed to provide a high force and extract heat from the laminate. The line compactor in a practice of this invention has 48 segments and covers an overall width of 123 mm. The chilled line compactor 46 is capable of applying 600 lb. force over the line segments.

The chilled area compactor having its segments 48 may have 8 rows of 48 segments and is able to chill an area of 123 mm wide while pushing with a 600 lb force. Chilled area compactor 24 also includes a downstream air cylinder 80 having its piston 82 press against bladder 84 similar to bladder 68. The movable members in the chilled compactor could also be mounted in a drawer or set of walls 86 as shown in FIG. 3.

The shape of each foot in the hot line compactor 20 and for the chilled line segments 46 may be curved, while the hot area feet 44 and chilled area feet 48 may be articulated.

FIG. 5 illustrates a practice in the application of tape to an object. As shown therein the tape 12 is placed into contact with the object 88. Shim 28 is disposed between the movable chilled members 46,48 in the chilled compactor 24. FIG. 5 illustrates how the compactor 24 is conformable to the irregular shape of object 88 which is illustrated as having a dished in or recessed section. Any other surface irregularities such as upwardly extending portions or curvatures would also be accommodated by the plurality of independently movable members 46,48. A similar action would take place in the heated compactors.

FIG. 4 illustrates cooling ports 76 located in the outer walls 62 of the heated compactor 22. As also shown in FIG. 4 adjusting screws 63 are provided to minimize the feet 44 from having any lateral movement.

Figure 6:
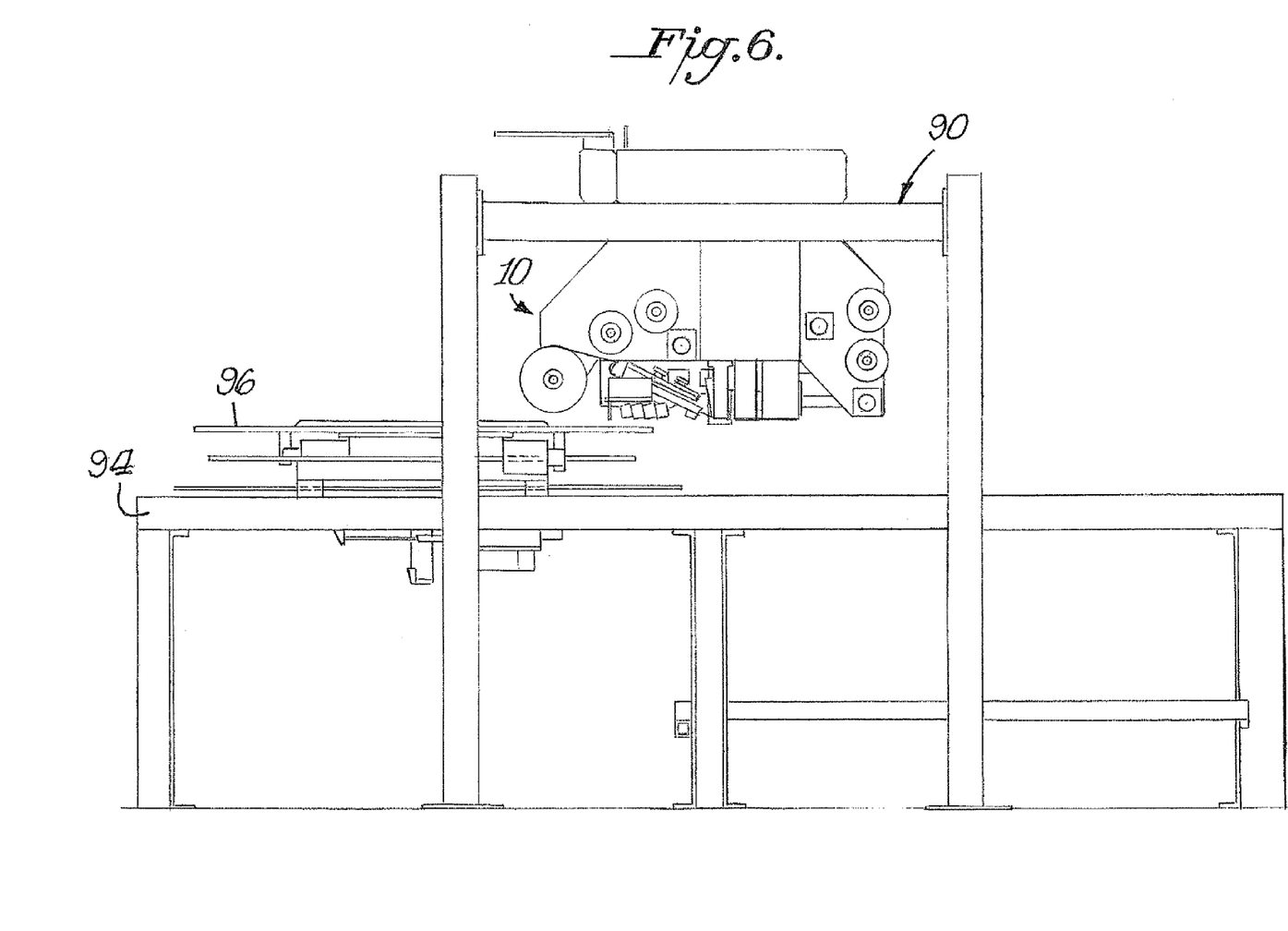
FIG. 6 is a side elevational view of a tape placement assembly which includes the tape placement head of FIGS. 1-5.
Figure 7:
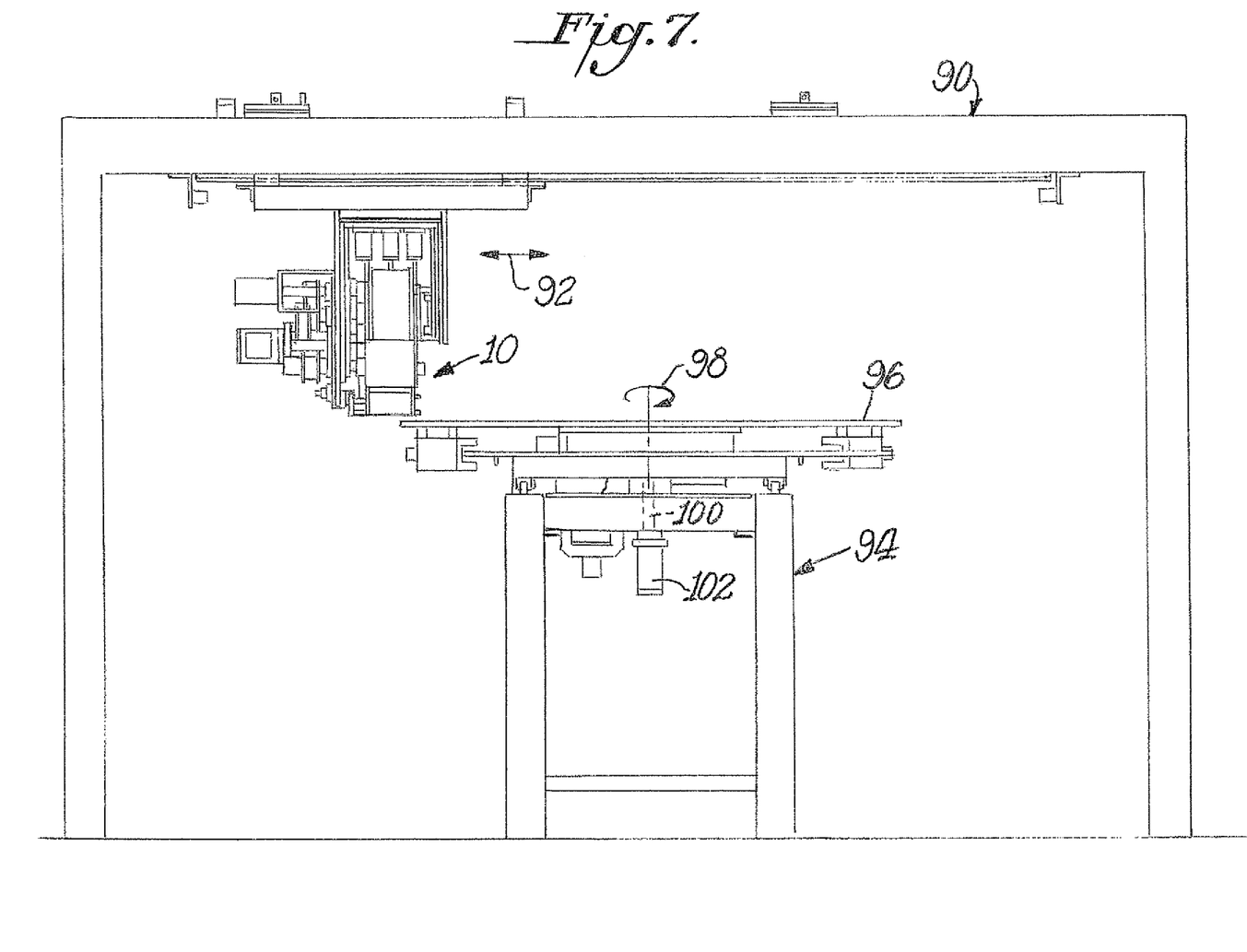
FIG. 7 is a front elevational view of the assembly shown in FIG. 6.

FIGS. 6-7 illustrate the mounting of head 10 to a gantry-style motion mechanism 90 so that the head 10 could move back and forth in a horizontal direction as indicated by the arrow 92 in FIG. 7. Any suitable structure may be used which could include a form of track and motor drive to accomplish this transverse movement. The assembly shown in FIGS. 6-7 also includes a work support device 94 which would include a support surface or table 96 on which the object would be mounted. The table 96 is rotatable in a horizontal plane as indicated by the arrow 98. Such rotation could be done in any suitable manner such as mounting the table on a shaft 100 driven by motor 102. In this manner, it is possible to change the horizontal orientation of the workpiece. The table could also be provided with structure to permit the workpiece to rotate about a horizontal axis so that the workpiece itself could be turned in a plane perpendicular to the rotational arrow 98. This would permit all surfaces of the three dimensional object to have tape applied to them.

Figure 8:
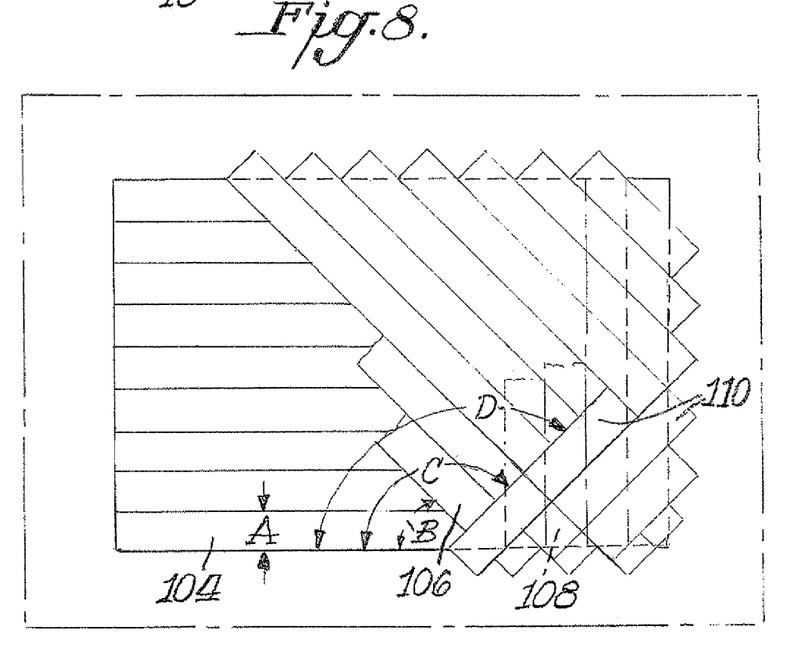
FIG. 8 is a schematic top plan view showing the placement of layers of tape in accordance with this invention.

By having the head 10 move transversely and by being able to rotate the object through use of the work support 94, it is possible to vary the angle of application of the tape when forming a composite laminate from multiple layers of tape. FIG. 8, for example, illustrates how a first layer 104 of tape might be applied on the object at an angle A of, for example, 0°. In the next application a layer 106 could be applied at the angle B of 45°. The next layer 108 could then be applied at an angle C of 90°. The fourth layer 110 could then be applied at an angle D of 135° and those angles could then be repeated for the requisite number of plies.

If desired, the table 96 could be indexed so as to automatically rotate to predetermined sequential angles. In this manner, the thermoplastic in situ consolidation process first applies energy to heat the incoming tape or tow and the already deposited substrate to its resin melt temperature. A normal compaction force is applied to the molten heat-zone and the layers are fused together. The laminate then refreezes and an in-process quality sensing system could view the refrozen area to measure some parameter related to any defects in the layer which had just been deposited. Accordingly, through use of the invention with heat and even pressure the incoming thermoplastic tape is consolidated layer by layer to the previously laid plies and becomes part of the laminate. Since each layer is fully completed after tape deposition no autoclave is required for this in situ process.

The invention may be practiced for applying tape to any desired object whether such objects have a completely planar surface or have irregularities or curvatures, depressions, etc. in their surface. Useful application of the invention could be had for such parts or objects such as wings and fuselage skins or in vehicles including tanks requiring skins or for any other object where a skin, particularly a multi-ply laminate is desired.

What is claimed is:

1. A tape placement head for applying thermoplastic tape/tow to an object comprising a supply of thermoplastic tape/tow, a heated compactor located in a heated zone downstream from said supply, a feeder for feeding the tape/tow from the supply and into the heated zone, said heated compactor having a plurality of heated members which are independently movable with respect to each other so as to be conformable to the shape of the object, a chilled zone downstream from said heated zone, a chilled compactor in said chilled zone, said chilled compactor having a plurality of chilled members which are independently movable with respect to each other so as to be conformable to the shape of the object, said tape/tow having a path of travel through said heated zone and through said chilled zone to be capable of being disposed against the object and to be in a heated condition in said heated zone and in a chilled condition in said chilled zone, an upstream shim arrangement for disposing an upstream shim in a path extending through said heated zone between said heated members and said tape/tow whereby said heated members may press said upstream shim against said tape/tow to press said tape/tow against the object, a downstream shim arrangement for disposing a downstream shim in a path through said chilled zone between said chilled members and said tape/tow whereby said chilled members may press said downstream shim against said tape/tow to maintain said tape/tow against the object, an upstream pressure applying arrangement for urging said plurality of heated members against said upstream shim in said heated zone which then can press the heated tape/tow against the object, and a downstream pressure applying arrangement for urging said chilling members against said downstream shim in said chilled zone which then can press the chilled tape/tow against the object.

2. The head of claim 1 wherein said movable heated members include a plurality of feet, each of said heated feet having an applicating end disposed toward the tape, said upstream pressure applying arrangement including a cylinder for pressing against a conformable bladder, said bladder being located to apply pressure to said feet, and a thermal break between said feet and said bladder.

3. The head of claim 2 wherein said applicating end of each of said feet is coated with a high temperature coating.

4. The head of claim 2 wherein said thermal break includes chilled members located between said bladder and said heated feet.

5. The head of claim 2 wherein said chilled compactor includes an area compactor having a plurality of feet, said downstream pressure applying arrangement comprising a cylinder applying a force to a bladder and said bladder applying force to said chilled feet.

6. The head of claim 5 wherein each of said cylinders applies a force to each of said bladders by each of said cylinders pressing against a liquid filled reservoir which presses against said bladder.

7. The head of claim 5 wherein said heated compactor comprises a heated area compactor having multiple rows of feet, an upstream heated line compactor having a single row of at least one heated member for applying pressure to the tape, and said upstream shim being located between said heated line compactor and said tape.

8. The head of claim 5 wherein each of said shim devices includes a supply spool and a take-up spool, and said tape supply being a creel.

9. The head of claim 5 including heaters located upstream from said heated line compactor.

10. The head of claim 9 wherein said upstream heaters are torches.

11. The head of claim 9 including a temperature sensor located in said heated zone.

12. The head of claim 9 wherein said head is mounted to a support for movement in a horizontal direction, a support structure mounted below said head, said support structure including a table, and said table being rotatable to change its orientation with respect to said head.

13. The head of claim 12 wherein said table is rotatable in a horizontal direction.

14. The head of claim 13 wherein said table is indexed for rotation at progressively increasing angles.

15. The head of claim 9 including a heated feeder upstream from said heated line compactor.

16. The head of claim 5 wherein said chilled compactor comprises an inline compactor having a single row of at least one movable chilled member, and further comprises an area compactor downstream from said chilled line compactor, and said area compactor comprising a plurality of rows of chilled members.

17. The head of claim 2 wherein said heated compactor comprises a heated area compactor having multiple rows of feet, an upstream heated line compactor having a single row of at least one heated member for applying pressure to the tape, and said upstream shim being located between said inline compactor and the tape.

18. The head of claim 2 wherein said head is mounted to a support for movement in a horizontal direction, a support structure mounted below said head, said support structure including a table, and said table being rotatable to change its orientation with respect to said head.

19. The head of claim 1 wherein said heated compactor comprises a heated area compactor having multiple rows of feet, an upstream heated line compactor having at least one heated members for applying pressure to the tape and said upstream shim being located between said inline compactor and the tape.

20. The head of claim 1 wherein said head is mounted to a support for movement in a horizontal direction, a support structure mounted below said head, said support structure including a table, and said table being rotatable to change its orientation with respect to said head.

21. The head of claim 1 wherein said chilled compactor comprises a compactor having a single row of at least one movable chilled member, and further comprises an area compactor downstream from said chilled line compactor, and said area compactor comprising a plurality of rows of chilled members.

22. A method of placing thermoplastic tape or tow to an object comprising feeding the tape/tow through a heated feeder and below a heated line compactor having a single row of at least one movable heated member, then conveying the tape/tow below a heated area compactor having a plurality of rows of heated feet which are independently extendable different distances with respect to each other so as to be conformable to the shape of the object located below the feet, inserting a shim between the tape/tow and the line compactor and between the tape/tow and the heated area compactor, pressing the heated feet of the heated area compactor against the shim and thereby against the tape/tow to move maintain the tape/tow in contact with the object while the tape/tow is in a heated condition, passing the tape/tow through a chilled zone while the tape/tow is against the object, pressing a row of chilled movable member from a line chilled compactor and pressing multiple rows of conformable feet from a chilled area compactor against a shim which is disposed between the chilled compactors and the tape/tow, and chilling the tape/tow so that it remains adhered to the object.

23. The method of claim 22 including applying a plurality of layers of tape/tow against the object, and rotating the object between applications so that each ply of tape/tow is disposed at a different angle than its underlying ply.

* * * * *